(12) United States Patent
Coyne et al.

(10) Patent No.: US 12,503,741 B2
(45) Date of Patent: Dec. 23, 2025

(54) FIRMWARE-BASED OUT-OF-ORDER COMMAND SCHEDULER

(71) Applicant: BAE SYSTEMS Information and Electronic Systems Integration Inc., Nashua, NH (US)

(72) Inventors: Patrick D. Coyne, Nashua, NH (US); Michael A. Zalucki, Hollis, NH (US); Joshua N. Fontaine, Amherst, NH (US); Alpha Balde, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 57 days.

(21) Appl. No.: 18/342,336

(22) Filed: Jun. 27, 2023

(65) Prior Publication Data

US 2025/0003020 A1  Jan. 2, 2025
US 2025/0257420 A9  Aug. 14, 2025
US 2025/0340961 A9  Nov. 6, 2025

(51) Int. Cl.
| | |
|---|---|
| *C21D 1/20* | (2006.01) |
| *C21D 1/63* | (2006.01) |
| *C21D 6/00* | (2006.01) |
| *C21D 9/04* | (2006.01) |
| *C22C 38/00* | (2006.01) |
| *C22C 38/02* | (2006.01) |
| *C22C 38/06* | (2006.01) |

(Continued)

(52) U.S. Cl.
CPC ............... *C21D 9/04* (2013.01); *C21D 1/20* (2013.01); *C21D 1/63* (2013.01); *C21D 6/002* (2013.01); *C21D 6/005* (2013.01); *C21D 6/008* (2013.01); *C22C 38/001* (2013.01); *C22C 38/002* (2013.01); *C22C 38/02* (2013.01); *C22C 38/06* (2013.01); *C22C 38/22* (2013.01); *C22C 38/38* (2013.01); *C21D 2211/001* (2013.01); *C21D 2211/002* (2013.01); *C21D 2211/005* (2013.01); *C21D 2211/008* (2013.01)

(58) Field of Classification Search
CPC ..................... G06F 13/1673; G06F 11/1004
See application file for complete search history.

(56) References Cited

U.S. PATENT DOCUMENTS

| | | |
|---|---|---|
| 7,085,704 B2 | 8/2006 | Yik et al. |
| 8,108,870 B2 | 1/2012 | Klingman |

(Continued)

*Primary Examiner* — Getente A Yimer
(74) *Attorney, Agent, or Firm* — Gary McFaline

(57) ABSTRACT

A method of scheduling commands for execution in a computing device includes receiving command data, where the command data includes a command to be executed on a processor and an execution start time for executing the command; storing the command data in a data storage; reading, responsive to determining that the execution start time is within an execution window, the command data from the data storage; and causing the command data to be output to a processor for execution. The method can include assigning a label to the command data, where the label corresponds to an address in the data storage, and where the command data is stored at, and read from, the address in the data storage. The method can include storing, responsive to determining that the execution start time is not within the execution window, the label, and the execution start time in a fast scheduler memory.

14 Claims, 6 Drawing Sheets

(51) Int. Cl.
    *C22C 38/22*     (2006.01)
    *C22C 38/38*     (2006.01)

(56) References Cited

U.S. PATENT DOCUMENTS

| | | |
|---|---|---|
| 8,387,066 B1 | 2/2013 | Becher et al. |
| 8,438,572 B2 | 5/2013 | Fecioru |
| 8,671,411 B2 | 3/2014 | Gosalia et al. |
| 8,881,161 B1 | 11/2014 | Chudgar et al. |
| 9,378,139 B2 | 6/2016 | Ricketts et al. |
| 9,618,922 B2 | 4/2017 | Nishiyama et al. |
| 10,120,712 B2 | 11/2018 | Singer et al. |
| 10,303,384 B1 | 5/2019 | Agarwal |
| 10,705,761 B2 | 7/2020 | Stankevichus |
| 11,050,675 B2 | 6/2021 | Holm et al. |
| 11,061,721 B2 | 7/2021 | Rimoni |
| 11,194,510 B2 | 12/2021 | Park et al. |
| 12,019,537 B2 * | 6/2024 | Hattingh ............. G06F 11/3688 |
| 12,063,148 B2 * | 8/2024 | Dabell ................. G06F 9/5077 |
| 2005/0251776 A1 * | 11/2005 | Hsin ....................... G06F 30/33 |
| | | 716/139 |
| 2018/0129770 A1 * | 5/2018 | Tamir ................... G06F 13/1673 |
| 2018/0165148 A1 * | 6/2018 | Watanabe ........... G06F 11/1004 |

\* cited by examiner

FIRMWARE-BASED OUT-OF-ORDER COMMAND SCHEDULER

STATEMENT OF GOVERNMENT INTEREST

This invention was made with government support under prime contract number 14 D 0423/19 F 0004 awarded by the United States Government. The government has certain rights in the invention.

FIELD OF DISCLOSURE

The present disclosure relates to computing systems, and more particularly, to firmware-based out-of-order command schedulers.

BACKGROUND

A computing system includes processing resources that are configured to perform one or more tasks, such as processes, threads, or other sequences of instructions. The tasks can be executed according to the capabilities of the processing resources and/or the relative execution priorities assigned to the tasks. For example, several tasks can be executed by a single central processing unit (CPU, or processor) in series, with one task beginning after the completion of another. In a multiprocessor system, certain tasks can be executed by multiple CPUs concurrently. In many systems, a scheduling process, also referred to as a scheduler, manages utilization of the processing resources. There remain a number of non-trivial issues with respect to schedulers.

Figure 1:
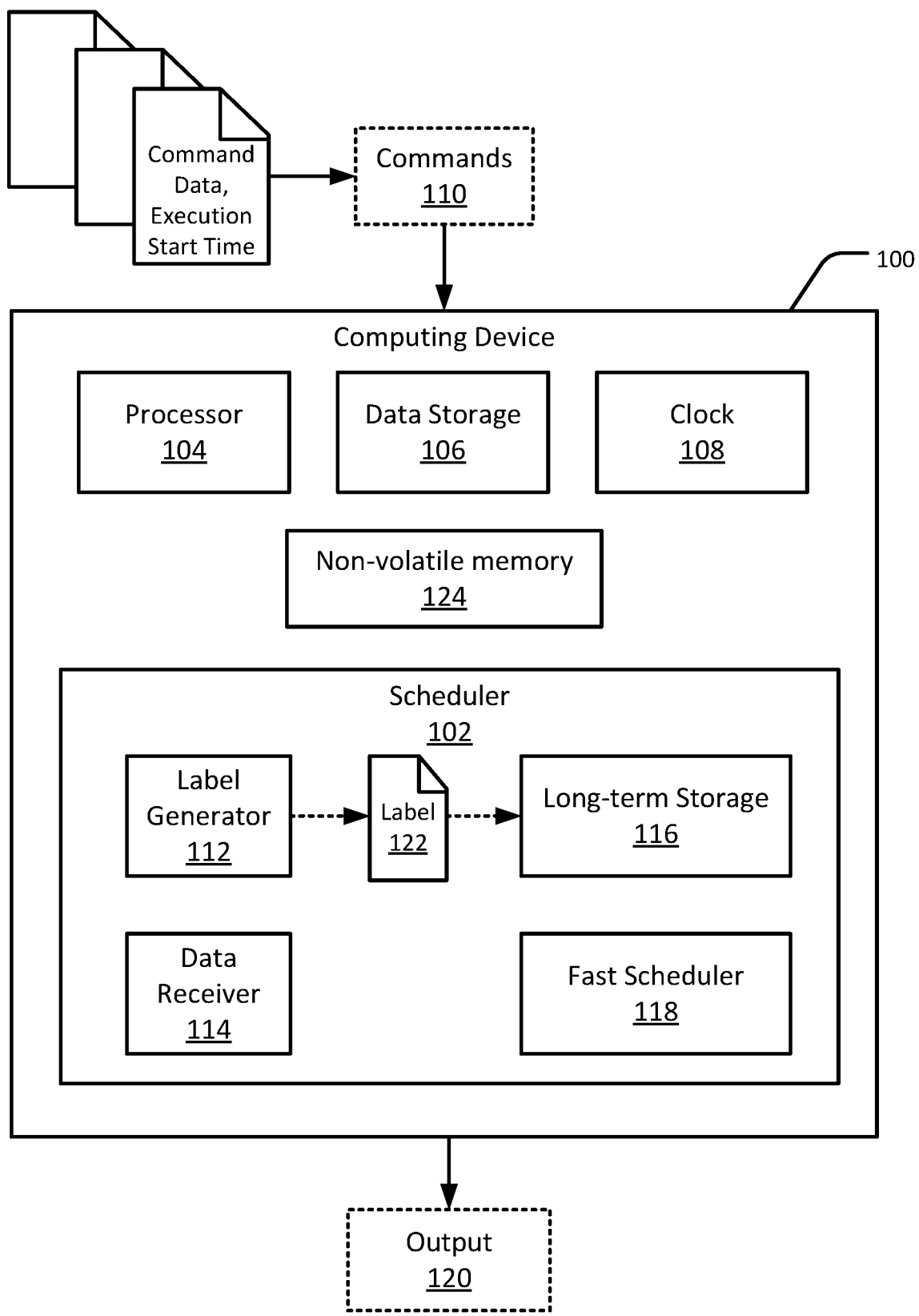
FIG. 1 is a block diagram of a computing device with a firmware-based out-of-order scheduler, in accordance with an example of the present disclosure.

Although the following detailed description will proceed with reference being made to illustrative examples, many alternatives, modifications, and variations thereof will be apparent in light of this disclosure.

DETAILED DESCRIPTION

Techniques for scheduling commands in a computing device are disclosed. In an example, a scheduling method includes receiving command data, where the command data includes a command to be executed on a processor of the computing device, and an execution start time for executing the command. The method further includes storing the command data in a data storage of the computing device; reading, responsive to determining that the execution start time is within an execution window, the command data from the data storage; and causing the command data to be output to a processor for execution. In some examples, the method includes assigning a label to the command data, where the label corresponds to an address in the data storage, and where the command data is stored at, and read from, the address in the data storage. In some examples, the method includes storing, responsive to determining that the execution start time is not within the execution window, the label and the execution start time in a fast scheduler first-in-first-out buffer (FIFO) and a fast scheduler memory, and further reading into a fast scheduler memory, responsive to determining that the execution start time is within the execution window, the label and the execution start time from the fast scheduler. In this manner, commands that arrive before the execution start time are temporarily stored in the long-term storage until the execution start time is within the execution window where they are then transferred to the fast scheduler. As will be described in further detail below, the commands stored in the fast scheduler (or in a buffer, such as a long-term storage) can be executed out of the order in which they were received according to the corresponding execution start times. The use of labels facilitates efficient use of memory for temporarily storing the commands within the scheduler while they are awaiting execution by the processor.

Overview

As noted above, there remain a number of non-trivial issues with respect to command schedulers. For instance, a conventional scheduler processes tasks in the order received, which may not be the most efficient use of the computing resources or may otherwise be inefficient for a given application. For example, if a first-received command is scheduled to execute in five seconds and a second-received command is scheduled to execute in one second, and if the commands are executed in the order received, then the second-received command will not execute until the first-received command completes execution, thus incurring at least a five-second execution delay. Executing tasks in the order received can limit the ability of the computing device to efficiently execute multiple concurrent tasks, tasks with varying resource requirements, and tasks from multiple users, and can also cause delays in the execution of time critical commands. Some software-based schedulers, such as those integrated into the operating system of a computing system, may have significant overhead that reduces throughput and increases latency, which can be less useful for real-time or high-traffic systems. Therefore, a need remains for a command scheduler that addresses these issues.

Example Firmware-Based Out-Of-Order Scheduler

FIG. 1 is a block diagram of a computing device 100 configured with a firmware-based out-of-order scheduler 102, in accordance with an example of the present disclosure. The device 100 can be implemented, for example, as a field programmable gate array (FPGA)-based or an application specific integrated circuit (ASIC)-based computing device, or in another integrated circuit-based device or system. For example, the device 100 includes a processor 104, a data storage 106, and a clock 108. The device 100 receives one or more commands 110 from a user and/or other system. Each of the commands 110 can be associated with an execution start time, which designates the real or system time at which the command is to be executed by the processor 104, which generates an output 120. The system time is maintained by the clock 108. The firmware-based out-of-order scheduler 102 includes a label generator 112, a data receiver 114, a long-term storage 116, and a fast scheduler 118. The label generator 112, the data receiver 114, the long-term storage 116, and the fast scheduler 118 can execute continuously and concurrently with each other, which allows pipelined processing of the commands 110 through the scheduler 102.

For example, the scheduler 102 provides the ability for multiple users to submit the commands 110 at the same time, or individual users to submit multiple commands, while helping to ensure that all of the commands 110 are executed according to the associated execution start times. Specifically, the scheduler 102 receives the commands 110 and the corresponding execution start times and arranges the commands 110 to be executed by the processor 104 at, or about, the designated execution start time rather than merely in the order that the commands 110 were received. For example, if the scheduler 102 receives a first command having a first execution start time for executing the first command prior to receiving a second command having a second execution start time for executing the second command, and if the second execution start time is before the first execution start time, the scheduler 102 can cause the processor 104 to execute the second command before executing the first command, despite having received the second command after the first command. Thus, depending on the execution start times, the scheduler 102 can cause the processor 104 to execute the commands 110 in a different order than they were received, such that the commands are more likely to be executed at or near the execution start times and not otherwise delayed by other commands. Having such an out-of-order scheduler based in firmware, according to some examples, increases the throughput of the commands 110 and reduces execution latency when resolving commands.

The scheduler 102, or portions thereof including the label generator 112, the data receiver 114, the long-term storage 116, the fast scheduler 118, or any combination of these, can be implemented in firmware, which is also referred to herein as a firmware-based scheduler. Such firmware can include machine-executable instructions that allow the hardware components of the system to function and communicate with any other component of the system, including other hardware, firmware, software, or memory/storage components. For example, the scheduler 102, or portions thereof, can be implemented as a set of machine-executable instructions that are stored in a non-volatile memory 124. The non-volatile memory can include, for example, read-only memory (ROM), electrically-programmable ROM (EPROM), electrically-erasable and programmable ROM (EEPROM), flash memory, or another type of device or computer memory that can retain stored information without power. The machine-executable instructions can be coded, for example, in a hardware description language (HDL) or other low-level language, such as machine code. The machine-executable instructions can be accessed and executed by hardware components of the computing device 100, such as the processor 104 (e.g., a central processing unit (CPU) or other co-processor), below and independently of any software-based components, such as a software-based operating system. For example, the processor 104 can execute the machine-executable instructions of the firmware-based scheduler 102 independently of any other machine-executable instructions, including those of the operating system. Such a firmware-based scheduler can thus operate more efficiently and with less latency than a software-based scheduler implemented within the operating system. The machine-executable instructions of the scheduler 102 can be permanently incorporated into the computing device 100 at manufacture, or can be updatable or otherwise overwritten in the non-volatile memory after manufacture, but otherwise remain static. The processor 104 is configured to execute the machine-executable instructions of the scheduler 102 stored in the non-volatile memory 124.

In more detail, the data receiver 114 receives all incoming commands 110, which are associated with a corresponding execution start time. The execution start time for each of the commands 110 specifies a target system (or real) time at which the respective command is to be executed by the processor 104. Upon startup or reset of the device 100, the label generator 112 generates a set of labels 122, which are used to mark and store incoming commands 110 in the data storage 106 and/or in the long-term storage 116 of the scheduler 102. The labels 122 can be, for example, a number of any bit size. In some examples, the labels 122 represent vectors (pointers) into addresses within the data storage 106 where the commands 110 are temporarily stored prior to execution. For example, a label "0001" can represent memory address "0001" in the data storage 106.

As the scheduler 102 receives the commands 110, the scheduler 102 assigns a unique label from the set of labels 122 to each of the commands 110 and schedules the commands 110 for execution using the labels 122. A benefit of using labels as representatives of the command data is that the size of the label data may be smaller than the size of the command data, and thus the labels 122 may be more efficient for the scheduler 102 to store and process. However, in some examples, the command data can be used instead of a label when the size of the command data is relatively small (e.g., approximately the same size as the label data). The scheduler 102 can reuse or recycle each of the labels 122 for other commands 110 after the command associated with the label has been output for execution by the processor 104.

When the labels are used, the scheduler 102 assigns an unused label from the set of labels 122 to the incoming commands 110 and stores the assigned label in the data storage 106. Otherwise, when the labels are not used, the scheduler 102 stores the command data in the data storage 106. In any event, the scheduler 102 determines whether the execution start time of each of the incoming commands 110 is within an execution window of the fast scheduler 118. The fast scheduler 118 schedules the commands 110 for execution if the execution start time is within the execution window. The execution window begins when the execution start time is within (less than or equal to) a configurable threshold time of the system time, as determined by the clock 108. For example, if the threshold time is one second and if the execution start time is within one second of the system time, then the execution window begins. If the execution start time is within the execution window, the fast scheduler 118 reads the command data associated with the label from the data storage 106 and sends the command data to the processor 104 for immediate execution. If the execution start time is not within the execution window, the scheduler 102 stores the label and the execution start time corresponding to the command data in the long-term storage 116 for deferred execution closer to the execution start time.

For the deferred command data, the scheduler 102 continuously scans through the execution start times for all of the labels 122 (or command data) stored in the long-term storage 116. When the execution start time of one of the labels 122 enters the execution window of the fast scheduler 118, the scheduler 102 transfers the label to the fast scheduler 118 for execution. The fast scheduler 118 reads each label and corresponding execution start time of the command data from the long-term storage 116. The fast scheduler 118 then arranges the labels 122 in the order that the labels will be output to the processor 104 according to the execution start times, where each label represents an address in the data storage 106. Each address represents a different execution start time within the execution window of the fast scheduler 118. If the address is already being used for another command, then the fast scheduler 118 assigns the label to the next available address in the long-term storage 116. When the execution start time of the command data is within the execution window of the fast scheduler 118, the scheduler 102 outputs the command data associated with the label to the processor 104 for execution.

The long-term storage 116 permits the commands 110 to be scheduled at various future times outside of the execution window, which shifts with the system time. The amount of the long-term storage 116 can be sized based on how far into the future the commands 110 are to be scheduled and the number of commands 110 that are expected to be stored in that time frame. The fast scheduler 118 facilitates execution of the commands 110 at the corresponding execution start time. By using different addresses in memory to represent different execution start times, the labels 122, and thus the corresponding command data, are automatically reordered when arranged in the long-term storage 116 by the fast scheduler 118. As noted above, the use of short, unique labels as a substitute for large amounts of command data increases the efficiency of the scheduler 102. However, the command data can be stored in the long-term storage 116 instead of a label when the size of the command data is relatively small.

Out-Of-Order Scheduler Methodologies

Figure 2:
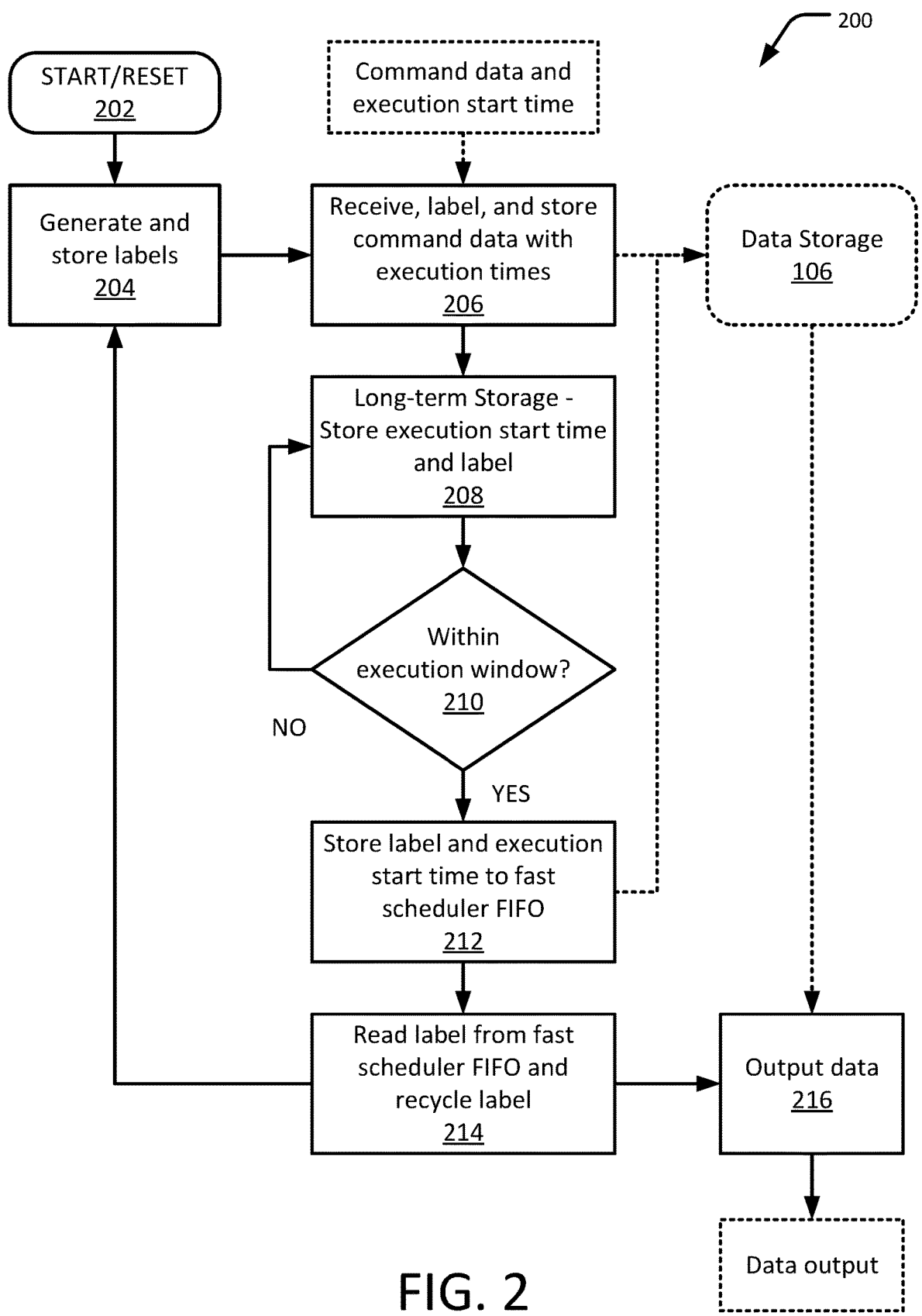
FIG. 2 is a flow diagram of a method of scheduling commands using the computing device of FIG. 1, in accordance with an example of the present disclosure.

FIG. 2 is a flow diagram of a method 200 of scheduling commands, in accordance with an example of the present disclosure. The method 200 can be implemented on, for example, the device 100 of FIG. 1. Upon start/reset 202, the method 200 includes generating 204 a set of labels and storing the labels in a first-in-first-out (FIFO) buffer for later use. Each of the labels represents an address in the data storage.

The method 200 further includes receiving 206 data input representing command data and an execution start time, assigning a label from the FIFO to the command data, and storing the command data, including the command and the execution start time, in the data storage 106. The label assigned to the command data is, for example, the next available and unused label in the set of labels stored in the FIFO. The command data is stored into the data storage 106 at the address corresponding to the label assigned to the command data. For example, if the label assigned to the data input is "0001" then the command data is stored at address '0001' in the data storage 106.

The method 200 further includes storing 208 the label assigned to the command data and the execution start time in the long-term storage 116. If the execution start time is within the execution window of the fast scheduler at 210, then the method 200 includes storing 212 the label and the execution start time to a fast scheduler buffer FIFO, and then in a fast scheduler memory (e.g., a block RAM (BRAM) or a dynamic RAM (DRAM)). Otherwise, the execution start time is periodically compared to the execution window of the fast scheduler 118 until the execution start time is within the execution window.

Note that when the command data includes several commands with different execution start times, the respective commands may be executed in a different order than received, depending on the execution start times. For example, if receiving 206 the command data includes receiving first and second command data, where the first command data includes a first command and a first execution start time for executing the first command, and the second command data includes a second command and a second execution start time for executing the second command, and where the first command data being received prior to receiving the second command data, then different labels are assigned to the first and second command data and the labels are stored 208 in the long-term storage 116.

The method 200 further includes reading 214 the label from the fast scheduler memory, and reading the command data from the data storage 106 based on the label. For example, as noted above, the label represents an address in the data storage 106 where the corresponding command data was previously stored in step 206. Thus, the command data can be read from the data storage 106 at the address specified by the label read out of the fast scheduler during the execution window. The label is recycled for use with future command data received at step 206. The method 200 further includes outputting 216 the command data to the processor 104 for execution. Note that the order of execution can be different from the order in which the commands were received by the scheduler 102, based on the execution start times of each command rather than on the order in which the commands were received.

Figure 3:
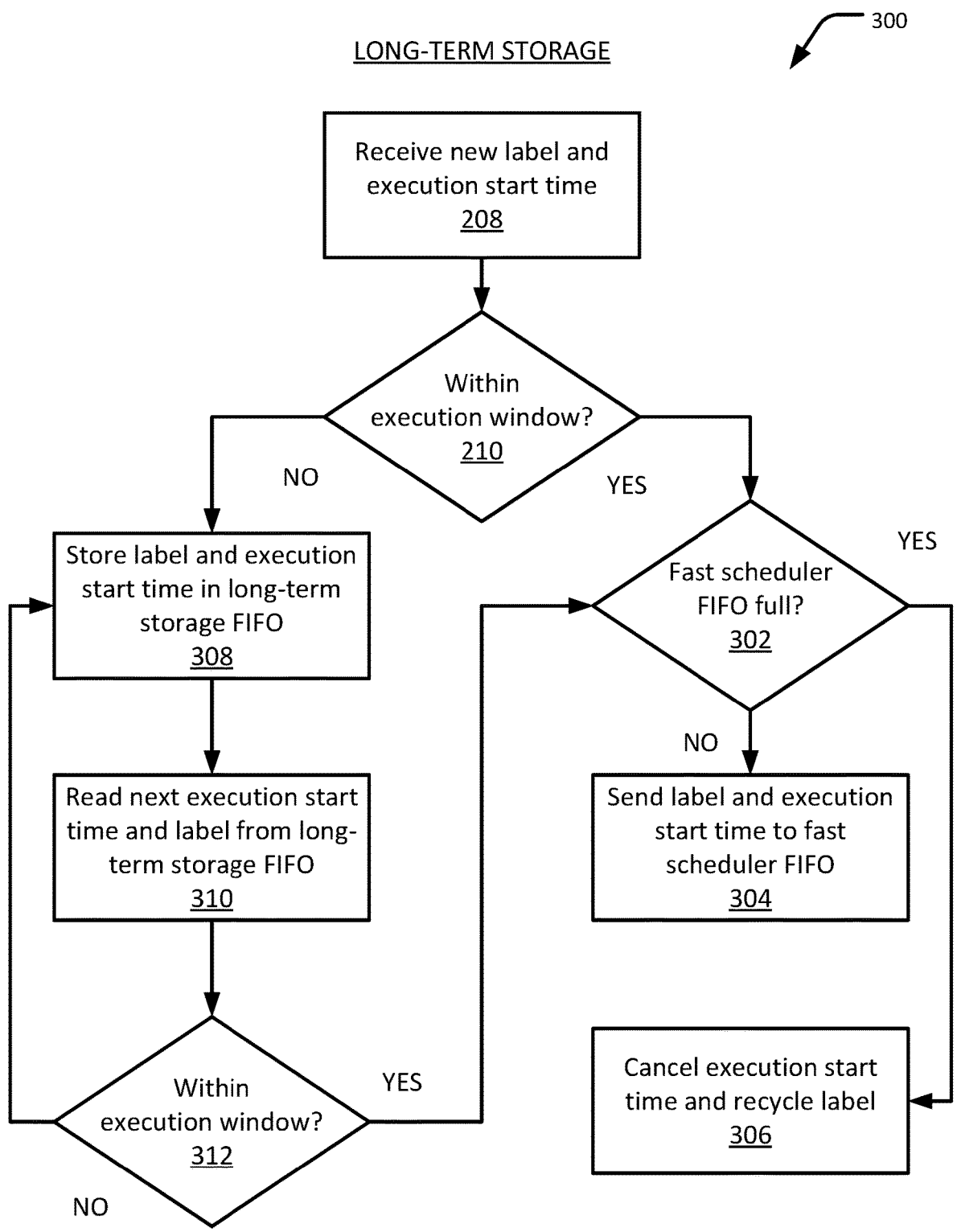
FIG. 3 is a flow diagram of a portion of the method of FIG. 2, in accordance with an example of the present disclosure.

FIG. 3 is a flow diagram of a portion 300 of the method 200 of FIG. 2, in accordance with an example of the present disclosure. Long-term storage begins once a label and execution start time are received at step 208. As noted above, the method 200 includes checking 210 if the execution start time is within the execution window of the fast scheduler. If it is, then the method 300 includes checking 302 to determine whether the fast scheduler memory and buffer FIFO is full. If the fast scheduler memory and buffer FIFO is not full, then the label and the execution start time are stored 304 in the fast scheduler buffer FIFO. Otherwise, the execution start time is canceled 306 because the command will not be able to execute before the execution start time, and the label is recycled.

If the newly received execution start time is not within the execution window of the fast scheduler, then the method 300 includes storing 308 the label and the execution start time in a long-term storage FIFO along with the corresponding label. The method 300 further includes reading 310 a label out of the long-term storage FIFO during each processor clock cycle that a new execution start time is not received. If the execution start time associated with the label is currently within the execution window at step 312, then the label and execution start time are sent to the fast scheduler FIFO. Otherwise, the label is stored again in the long-term FIFO at step 308, and further processed as discussed above until the execution start time is within the execution window.

Figure 4:
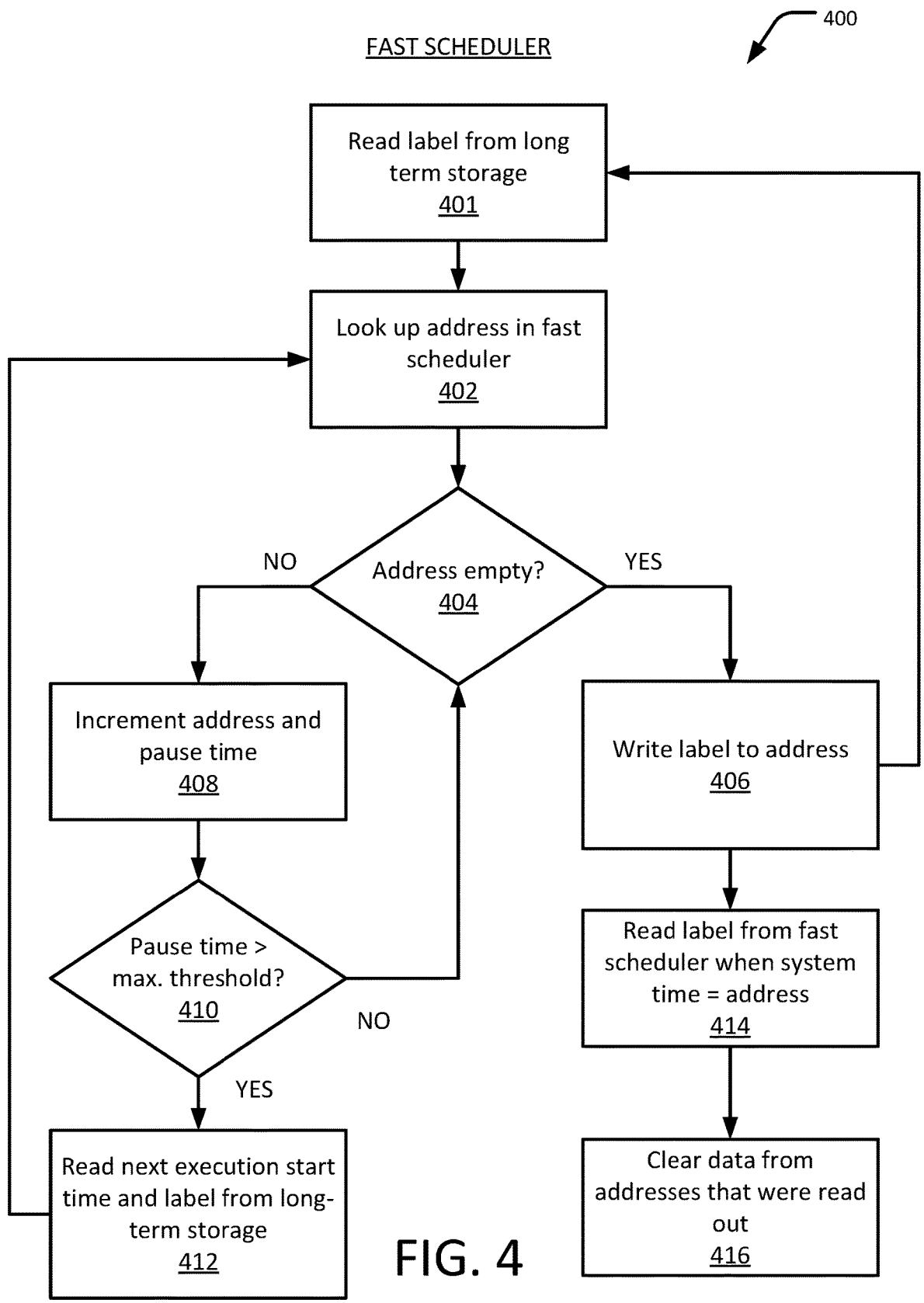
FIG. 4 is a flow diagram of a method of processing a fast scheduler of the computing device of FIG. 1, in accordance with an example of the present disclosure.

FIG. 4 is a flow diagram of a method 400 of processing the fast scheduler memory, in accordance with an example of the present disclosure. The method 400 includes reading 401 the label from the long-term storage 116. The method 400 further includes looking up 402 the address specified by the label and corresponding execution start time in the fast scheduler memory. If the address in the fast scheduler memory associated with the label is empty at step 404, then the method 400 includes writing 406 the label received from the long-term storage 116 into the address of the fast scheduler memory. If the address in the fast scheduler memory is not empty at step 404, then the method 400 includes incrementing 408 the address by one along with a pause time, which represents an amount of time the label has to wait to be written or otherwise stored into the fast scheduler buffer FIFO. This continues until an unused address is found in the fast scheduler memory or until the pause time reaches a maximum threshold at step 410. If the pause time exceeds the maximum threshold, then the execution start time (and the associated command) is canceled and the corresponding label is recycled. In such cases, the method 400 includes reading 412 the next execution start time and label from the long-term storage 116.

Meanwhile, the system time is used to read through the addresses in the fast scheduler memory, and when an address with a label stored there at step 406 is found, the method 400 includes reading 414 the label from the fast scheduler memory and reading the command data from the data storage 106 based on the label, such as at step 214 of FIG. 2. The method 400 further includes clearing 416 the label from the fast scheduler memory after the data has been read out at step 414.

Figure 5:
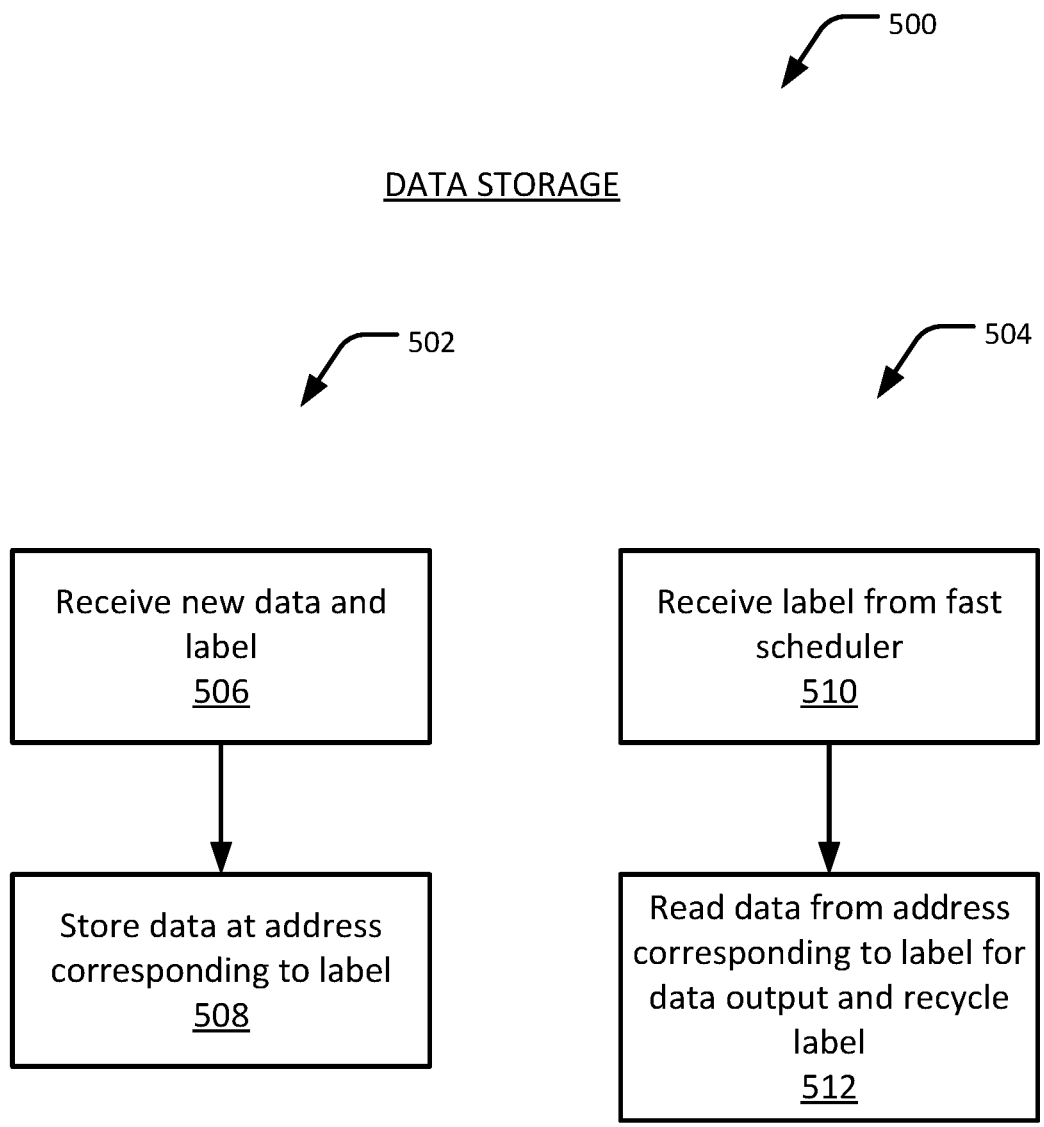
FIG. 5 is a flow diagram of a method of processing data in a data storage of the computing device of FIG. 1, in accordance with an example of the present disclosure.

FIG. 5 is a flow diagram of a method 500 of processing data in the data storage 106, in accordance with an example of the present disclosure. The method 500 includes two parallel tasks 502 and 504. Task 502 includes receiving 506 new data and the associated label, and storing 508 the data at the address in the data storage specified by the label. Task 504 includes receiving 510 a label from the fast memory and reading 512 the data from the address in the data storage specified by the label, and then recycling the label for future use.

Figure 6:
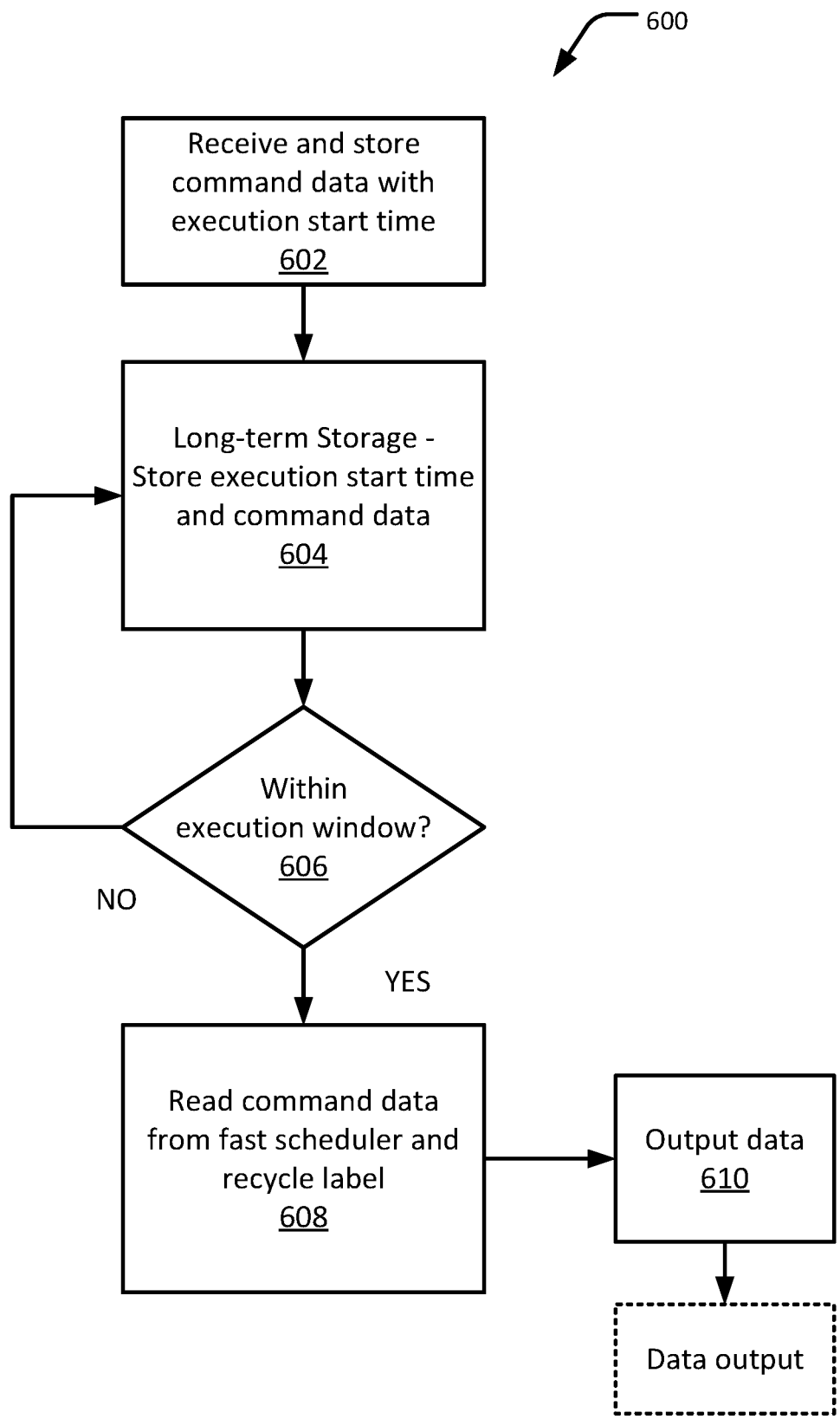
FIG. 6 is a flow diagram of another method of scheduling commands using the computing device of FIG. 1, in accordance with an example of the present disclosure.

FIG. 6 is a flow diagram of a method 600 of out-of-order scheduling when labels, such as described above, are not used, in accordance with an example of the present disclosure. The method 600 can be used, for example, when the data being scheduled is small enough that labels are not needed to increase efficiency of the scheduler. Instead of generating labels for incoming data, the method 600 includes receiving and storing 602 command data and associated execution start times where labels would be in the long-term storage and the fast scheduler. The method 600 further includes storing 604 the command data and the execution start time in the long-term storage 116. If the execution start time is within the execution window 606 of the fast scheduler, then the method 600 includes sending the command data and the execution start time to a fast scheduler memory. Otherwise, the execution start time is periodically compared to the execution window of the fast scheduler until the execution start time is within the execution window. The method 600 further includes reading 608 the command data from the fast scheduler memory. The method 600 further includes outputting 610 the command data to the processor for execution.

Further Examples

The following examples pertain to further examples, from which numerous permutations and configurations will be apparent.

Example 1 provides a method of scheduling commands for execution in a computing device. The method comprises receiving, by at least one of a field gate programmable array (FPGA) and an application-specific integrated circuit (ASIC), command data including a command and an execution start time for executing the command; storing, by the at least one of the FPGA and the ASIC, the command data in a data storage; reading, by the at least one of the FPGA and the ASIC and responsive to determining that the execution start time is within an execution window, the command data from the data storage; and causing, by the at least one of the FPGA and the ASIC, the command data to be output to a processor for execution.

Example 2 includes the subject matter of Example 1, further comprising assigning a label to the command data, wherein the label corresponds to an address in the data storage, and wherein the command data is stored at, and read from, the address in the data storage.

Example 3 includes the subject matter of Example 2, further comprising storing, responsive to determining that the execution start time is not within the execution window, the label and the execution start time in a fast scheduler buffer first-in-first-out (FIFO) and a fast scheduler memory; and reading, responsive to determining that the execution start time is within the execution window, the label and the execution start time from the fast scheduler memory.

Example 4 includes the subject matter of Example 3, further comprising incrementing, responsive to determining that that the address associated with the label is not empty, the address associated with the label by one while a pause time is less than or equal to a maximum threshold, wherein the pause time represents an amount of time the label had to wait to be stored into the data storage.

Example 5 includes the subject matter of any one of Examples 3 and 4, further comprising canceling the execution start time responsive to determining that the fast scheduler buffer FIFO and the fast scheduler memory is full.

Example 6 includes the subject matter of any one of Examples 3-5, further comprising clearing data from the address associated with the label responsive to reading the label and the execution start time from the fast scheduler memory.

Example 7 includes the subject matter of any one of Examples 1-6, wherein the execution window is a period of time beginning when the execution start time is less than or equal to a configurable threshold time of a system time.

Example 8 includes the subject matter of any one of Examples 1-7, wherein: receiving the command data includes receiving first and second command data, the first command data including a first command and a first execution start time for executing the first command, and the second command data including a second command and a second execution start time for executing the second command, the first command data being received prior to receiving the second command data; storing the command data includes storing the first and second command data in the data storage; reading the command data from the data storage includes reading, responsive to determining that the second execution start time is within a first execution window, the second command data from the data storage, causing the second command data to be output to the processor for execution, reading, responsive to determining that the first execution start time is within a second execution window, the first command data from the data storage, and causing the first command data to be output to the processor for execution, such that the second command data is executed by the processor prior to the first command data being executed by the processor.

Example 9 provides a computing device comprising at least one processor; a data storage operatively coupled to the at least one processor; and a non-volatile memory storing machine-executable instructions of a firmware-based scheduler configured to receive command data, the command data including a command and an execution start time for executing the command, store the command data in a data storage, read, responsive to determining that the execution start time is within an execution window, the command data from the data storage, and cause the command data to be output to the at least one processor for execution.

Example 10 includes the subject matter of Example 9, wherein the firmware-based scheduler is further configured to assign a label to the command data, wherein the label corresponds to an address in the data storage, and wherein the command data is stored at, and read from, the address in the data storage.

Example 11 includes the subject matter of Example 10, wherein the firmware-based scheduler is further configured to store, responsive to determining that the execution start time is not within the execution window, the label and the execution start time in a fast scheduler buffer first-in-first-out (FIFO) and a fast scheduler memory; and read, responsive to determining that the execution start time is within the execution window, the label and the execution start time from the fast scheduler memory.

Example 12 includes the subject matter of Example 11, wherein the firmware-based scheduler is further configured to increment, responsive to determining that that the address associated with the label is not empty, the address associated with the label by one while a pause time is less than or equal to a maximum threshold, wherein the pause time represents an amount of time the label had to wait to be stored into the data storage.

Example 13 includes the subject matter of any one of Examples 11 and 12, wherein the firmware-based scheduler is further configured to cancel the execution start time responsive to determining that the fast scheduler buffer FIFO and a fast scheduler memory is full.

Example 14 includes the subject matter of any one of Examples 11-13, wherein the firmware-based scheduler is further configured to clear data from the address associated with the label responsive to reading the label and the execution start time from the fast scheduler memory.

Example 15 includes the subject matter of any one of Examples 9-14, wherein the execution window is a period of time beginning when the execution start time is less than or equal to a configurable threshold time of a system time.

Example 16 includes the subject matter of any one of Examples 9-15, further comprising at least one of a field gate programmable array (FPGA) and an application-specific integrated circuit (ASIC) each configured to execute at least a portion of the machine-executable instructions of the firmware-based scheduler.

Example 17 provides a firmware-based scheduler for scheduling commands in a computing system, the firmware-based scheduler configured to receive command data, the command data including a command and an execution start time for executing the command; store the command data in a data storage; read, responsive to determining that the execution start time is within an execution window, the command data from the data storage, the execution window being a period of time beginning when the execution start time is less than or equal to a configurable threshold time of a system time; and cause the command data to be output to at least one processor for execution.

Example 18 includes the subject matter of Example 17, further configured to assign a label to the command data, wherein the label corresponds to an address in the data storage, and wherein the command data is stored at, and read from, the address in the data storage.

Example 19 includes the subject matter of Example 18, further configured to store, responsive to determining that the execution start time is not within the execution window, the label and the execution start time in a fast scheduler buffer first-in-first-out (FIFO) and a fast scheduler memory; and read, responsive to determining that the execution start time is within the execution window, the label and the execution start time from the fast scheduler memory.

Example 20 includes the subject matter of any one of Examples 18 and 19, further configured to increment, responsive to determining that that the address associated with the label is not empty, the address associated with the label by one while a pause time is less than or equal to a maximum threshold, wherein the pause time represents an amount of time the label had to wait to be stored into the data storage.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the modular antenna.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A method of scheduling commands for execution in a computing device, the method comprising:
   receiving, by at least one of a field gate programmable array (FPGA) and an application-specific integrated circuit (ASIC), command data including a command and an execution start time for executing the command;
   storing, by the at least one of the FPGA and the ASIC, the command data in a data storage;
   reading, by the at least one of the FPGA and the ASIC and responsive to determining that the execution start time is within an execution window, the command data from the data storage;
   causing, by the at least one of the FPGA and the ASIC, the command data to be output to a processor for execution;

assigning a label to the command data, wherein the label corresponds to an address in the data storage, and wherein the command data is stored at, and read from, the address in the data storage;

storing, responsive to a determination that the execution start time is not within the execution window, the command data in a long-term storage;

continuously scanning the long-term storage for command data having an execution time which has entered the execution window and, responsive to a determination that the execution time has entered the execution window, transferring the label assigned to the command data and the execution start time to a fast scheduler memory; and reading, responsive to determining that the execution start time is within the execution window, the label and the execution start time from the fast scheduler memory.

2. The method of claim 1, further comprising:

incrementing, responsive to determining that that the address associated with the label is not empty, the address associated with the label by one while a pause time is less than or equal to a maximum threshold, wherein the pause time represents an amount of time the label had to wait to be stored into the data storage.

3. The method of claim 1, further comprising canceling the execution start time responsive to determining that the fast scheduler buffer FIFO and the fast scheduler memory is full.

4. The method of claim 1, further comprising clearing data from the address associated with the label responsive to reading the label and the execution start time from the fast scheduler memory.

5. The method of claim 1, wherein the execution window is a period of time beginning when the execution start time is less than or equal to a configurable threshold time of a system time.

6. The method of claim 1, wherein:

receiving the command data includes receiving first and second command data, the first command data including a first command and a first execution start time for executing the first command, and the second command data including a second command and a second execution start time for executing the second command, the first command data being received prior to receiving the second command data;

storing the command data includes storing the first and second command data in the data storage; and reading the command data from the data storage includes reading, responsive to determining that the second execution start time is within a first execution window, the second command data from the data storage, causing the second command data to be output to the processor for execution, reading, responsive to determining that the first execution start time is within a second execution window, the first command data from the data storage, and causing the first command data to be output to the processor for execution, such that the second command data is executed by the processor prior to the first command data being executed by the processor.

7. A computing device comprising:
at least one processor;
a data storage operatively coupled to the at least one processor; and
a non-volatile memory storing machine-executable instructions of a firmware-based scheduler configured to receive command data, the command data including a command and an execution start time for executing the command, store the command data in a data storage, read, responsive to determining that the execution start time is within an execution window, the command data from the data storage, and cause the command data to be output to the at least one processor for execution;

wherein the firmware-based scheduler is further configured to assign a label to the command data, wherein the label corresponds to an address in the data storage, and wherein the command data is stored at, and read from, the address in the data storage; and wherein the firmware-based scheduler is further configured to:

store, responsive to determining that the execution start time is not within the execution window, the label and the execution start time in a long-term storage;

scan the long-term storage for command data having an execution time which has entered the execution window and, responsive to a determination that the execution time has entered the execution window, transferring the label assigned to the command data and the execution start time to a fast scheduler memory; and read, responsive to determining that the execution start time is within the execution window, the label and the execution start time from the fast scheduler memory.

8. The computing device of claim 7, wherein the firmware-based scheduler is further configured to:

increment, responsive to determining that that the address associated with the label is not empty, the address associated with the label by one while a pause time is less than or equal to a maximum threshold, wherein the pause time represents an amount of time the label had to wait to be stored into the data storage.

9. The computing device of claim 7, wherein the firmware-based scheduler is further configured to cancel the execution start time responsive to determining that the fast scheduler buffer FIFO and the fast scheduler memory are full.

10. The computing device of claim 7, wherein the firmware-based scheduler is further configured to clear data from the address associated with the label responsive to reading the label and the execution start time from the fast scheduler memory.

11. The computing device of claim 7, wherein the execution window is a period of time beginning when the execution start time is less than or equal to a configurable threshold time of a system time.

12. The computing device of claim 7, further comprising at least one of a field gate programmable array (FPGA) and an application-specific integrated circuit (ASIC) each configured to execute at least a portion of the machine-executable instructions of the firmware-based scheduler.

13. A firmware-based scheduler for scheduling commands in a computing system, the firmware-based scheduler configured to:

receive command data, the command data including a command and an execution start time for executing the command;

store the command data in a data storage;

read, responsive to determining that the execution start time is within an execution window, the command data from the data storage, the execution window being a period of time beginning when the execution start time is less than or equal to a configurable threshold time of a system time;

assign a label to the command data, wherein the label corresponds to an address in the data storage, and wherein the command data is stored at, and read from, the address in the data storage;

store, responsive to determining that the execution start time is not within the execution window, the label and the execution start time in a long-term storage;

scan the long-term storage for command data having an execution time which has entered the execution window and, responsive to a determination that the execution time has entered the execution window, transferring the label assigned to the command data and the execution start time to a fast scheduler memory;

read, responsive to determining that the execution start time is within the execution window, the label and the execution start time from the fast scheduler memory; and cause the command data to be output to at least one processor for execution.

14. The firmware-based scheduler of claim 13, further configured to:

increment, responsive to determining that that the address associated with the label is not empty, the address associated with the label by one while a pause time is less than or equal to a maximum threshold, wherein the pause time represents an amount of time the label had to wait to be stored into the data storage.

* * * * *